United States Patent [19]

Mitsch

[11] Patent Number: 5,336,850
[45] Date of Patent: Aug. 9, 1994

[54] ELECTRICAL POWER CORD ENTRY DEVICE

[75] Inventor: Brian M. Mitsch, Perrysville, Ohio

[73] Assignee: General Signal Corporation, Stamford, Conn.

[21] Appl. No.: 963,202

[22] Filed: Oct. 19, 1992

Related U.S. Application Data

[63] Continuation of Ser. No. 624,827, Dec. 10, 1990.

[51] Int. Cl.⁵ ............................................. H02G 15/013
[52] U.S. Cl. .................................. 174/65 SS; 285/343
[58] Field of Search ............... 174/65 SS, 70 S, 151; 285/343

[56] References Cited

U.S. PATENT DOCUMENTS

| | | | |
|---|---|---|---|
| 2,091,851 | 8/1937 | Halvorson | 174/65 SS |
| 2,563,829 | 8/1951 | Fitzgerald et al. | 174/65 SS |
| 2,941,025 | 6/1960 | Wayman | 174/65 SS |
| 3,913,956 | 10/1975 | Eidelberg et al. | 174/65 SS X |
| 4,226,432 | 10/1980 | Nakamizo | 174/65 SS X |
| 4,600,803 | 7/1986 | Holzmann | 174/65 SS |
| 4,789,759 | 12/1988 | Jones | 174/65 SS |
| 5,015,804 | 5/1991 | Nattel et al. | 174/65 SS |

FOREIGN PATENT DOCUMENTS

| | | | |
|---|---|---|---|
| 568685 | 1/1933 | Fed. Rep. of Germany | 174/65 SS |
| 1911652 | 9/1970 | Fed. Rep. of Germany | 174/65 SS |
| 2527265 | 1/1976 | Fed. Rep. of Germany | 174/65 SS |
| 2075770 | 11/1981 | United Kingdom | 174/65 SS |

Primary Examiner—Leo P. Picard
Assistant Examiner—David Tone
Attorney, Agent, or Firm—Milton E. Kleinman; Raymond E. Smiley; Robert S. Smith

[57] ABSTRACT

The invention of this disclosure is an economical sealing device that utilizes two seals to protect an electrical power cord or cable from its environment. The cord or cable couples a power source to electrical equipment that is located behind a material. A standard cord grip is used to push a molded assembly, (which is located at the end of the cable passing through the material) against a molded seat assembly to obtain a first seal. The second seal is obtained by tightening the cord grip with a nut.

5 Claims, 1 Drawing Sheet

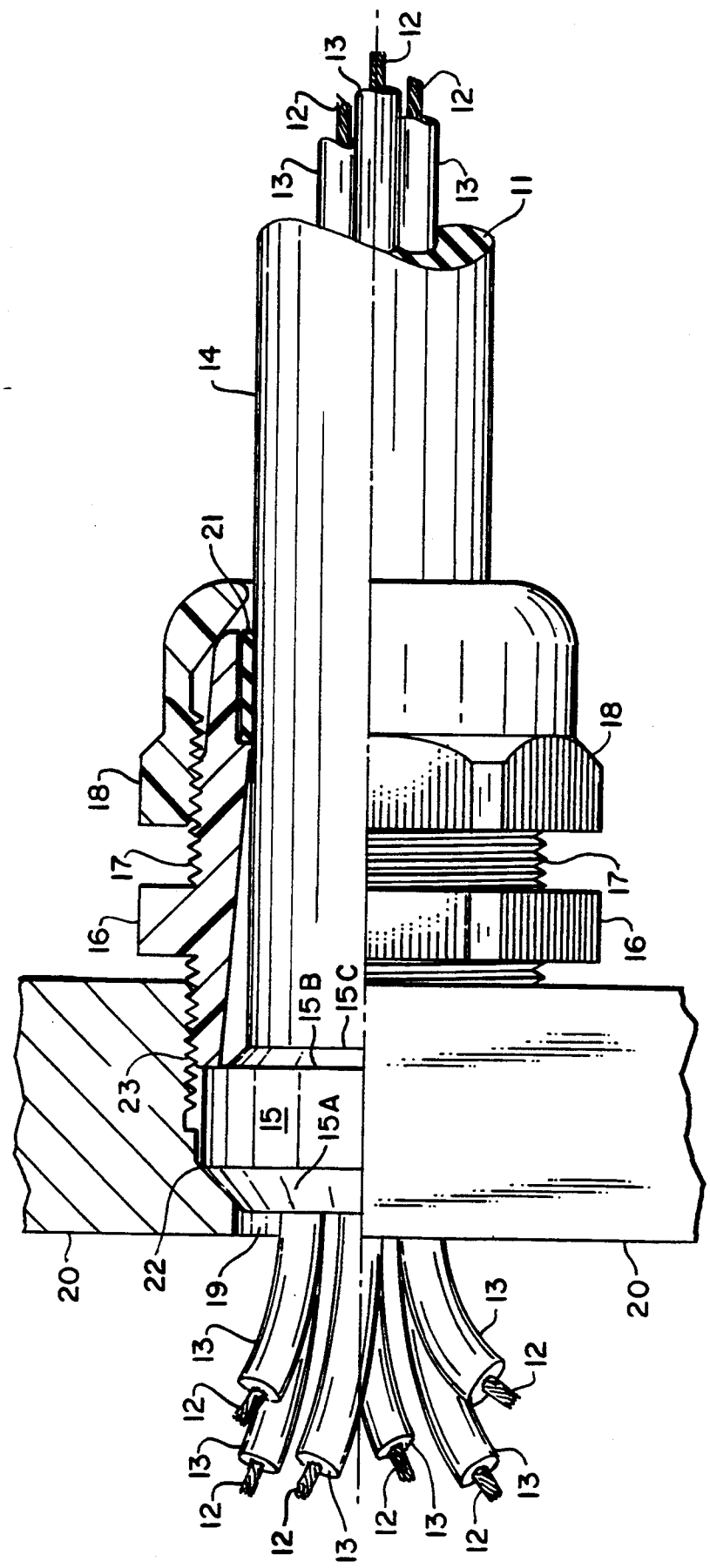

ELECTRICAL POWER CORD ENTRY DEVICE

This is a continuation of application Ser. No. 07/624,827, filed Dec. 10, 1990.

BACKGROUND OF THE INVENTION

This invention relates to electrical devices and more particularly to an electrical power cord entry device that provides a fluid tight joint between the electrical device and the cord.

Many electrical devices receive electrical power by having a cord or cable connected to a plug, which is inserted into an electrical socket.

Typically the cord or cable has a covering to protect the cord or cable against the accumulation of moisture and against corrosion. In general, the outer jacket of a cable will be waterproof in the way that a garden hose is waterproof. Water will not penetrate the jacket under normal conditions but will be carried along the length of the cable if it enters at the end of the cable or through a break in the cable jacket.

If a cable is to be used underwater or in a severe moisture environment, and one end must enter a sealed device which is underwater or in the wet environment, a means must be provided to keep water or moisture from entering the device and the cable at the point of entry of the cable. A molded cord end will isolate interior and exterior environments from each other and prevent wicking by the insulation in the cord. If the cable is reasonably round and firm, a packing gland may be used. Sealing compounds are often used in conjunction with the packing gland to obtain a tight mechanical seal.

The prior art obtained a double seal by using castings and stripped leads together with a potting compound. One of the difficulties with the above process was that the process was labor intensive and hence expensive.

Reference may be had to the following patents for further information concerning the state of the prior art.

U.S. Pat. No. 4,481,697 issued Nov. 13, 1984 to Walter N. Bachle and assigned to the assignee of this application discloses a body member, a grommet, a strain relief member and a nut. Tightening the nut onto the body member results in radial forces between the grommet and the cord to restrain the cord and provide a water tight seal. The grommet is stuffed into the body member by an interaction between the grommet and the strain relief member as the nut is engaged with the body member.

U.S. Pat. No. 3,891,294 issued Jun. 24, 1975 to Robert A. Phillibert and assigned to the assignee of this application discloses a two part clamping device that is adapted to fit within a locking collar that is used at the outer end of a connector. The Clamping device is provided with suitably designed flanges that can be inserted through an aperture and into the interior of the locking collar from the outside. A pair of ears, for each of the clamping device parts, extend radially outwardly from either side thereof, such ears lying in a plane which passes near the longitudinal axis of the clamping device. Each of such ears is provided with a screw receiving hole, and a pair of screws are used to bring the two parts of the clamping device together, so as to clamp or grip the cable or cord.

U.S. Pat. No. 4,350,840 issued Sep. 21, 1982 to Leonard H. Michaels discloses a compression chamber with a distortable grommet which has independent gripper elements that are socketed into the grommet so that the gripper elements perform a compound closing action on the cord with the result that the cord grip has great flexibility as to the range of sizes and types of cords it will accept.

U.S. Pat. No. 4,549,038 issued Oct. 22, 1985 to Fred Masherls et al. discloses a cord grip that contains a compression chamber with a distortable grommet which has gripper elements associated therewith so that the gripper elements perform a closing action on the cord in response to reduction in the volume of the compression chamber.

SUMMARY OF THE INVENTION

This invention overcomes the difficulties of the prior art by providing an improved economical cord or cable entry sealing device that utilizes two seals. In a two sealing device two seal failures must occur before a leak is obtained. The apparatus of this invention utilizes a standard cord grip to push a molded assembly against a thick seat to obtain a primary seal. The secondary seal is obtained by tightening the cord grip or strain relief grip. A standard thread sealant may be placed over the threads to improve the quality of the seals.

It is an object of this invention to provide a new and improved cord or cable entry sealing device that utilizes two seals.

It is another object of this invention to provide a new and improved economical cord or cable entry sealing device that utilizes two seals.

It is a further object of this invention to provide a double sealing entry device that utilizes a standard cord grip to compress the molded cord or cable ends.

Other objects and advantages of this invention will become apparent as the following description proceeds, which description should be considered together with the accompanying drawing.

BRIEF DESCRIPTION OF THE DRAWING

The invention will be better understood by reference to the accompanying single FIGURE which is an elevational view partially in section showing one form of the apparatus of this invention.

DESCRIPTION OF A PREFERRED EMBODIMENT

Referring now to the drawing in detail, the reference character 11 represents an electrical cord or cable that is used for the transmission of electrical power. The cord 11 contains stranded bare copper conductors 12 and each individual conductor 12 is covered with its own layer of insulation 13. The cord 11 is covered by a tough protective material covering 14, such as a synthetic rubber material like Neoprene. The material 14 protects the conductors 12 against the environment.

A molded cord end 15 is attached to one of the ends of the cord 11. As shown in the drawing the molded cord end 15 has a first truncated conical section 15A having the smaller end thereof at the free end of the cord or cable 11. Axially adjacent to the larger end of the conical section 15A is a cylindrical section portion 15B. Axially adjacent to the cylindrical section portion is truncated conical section portion 15C that has the larger end thereof adjacent to the cylindrical section portion 15B. Thus, the illustrated axial cross section has a left (as viewed) sloping portion that tapers to a middle constant-diameter portion and a sloping portion that tapers to the uniform diameter material 14. The covering 14 and the molded cord end 15 will be referred to herein collectively as a molded assembly.

In some embodiments Din connectors, spade connectors or other terminations may be molded into the cord end. Axially adjacent to the end 15 is the cylindrical section shaped section of covering 14.

A standard cord grip or strain relief grip 16 is placed over the molded cord end 15 and a portion of the material 14. The grip 16 has screw threads 17 along a portion of its outer surface. The nut 18 engages the threads 17 and forces the grip 16 and the nut 18 together.

In order to accommodate the passage of electrical current from a power source to an electrical device, (not shown) that may be in a wet environment, an opening 19 is provided in the wall 20 of the electrical device. The opening 19 provides means for the entry of the conductors 12 into the electrical device. The opening or bore 19 is has a truncated conical seat disposed therein that cooperates with the surface 15A of the end 15. In addition the bore 19 has internal threads for cooperation with the external threads 23 of the grip 16.

It will be seen that the threads of the nut 18 cooperate with the threads 17 of the grip 16 to produce a first sealing surface at a seal ring or location 21. A second sealing surface at location 22 is produced by the engagement of the threads 23 of the grip 16 with the threads of the wall 20. It will be seen that the cooperation of the nut 18 with the grip 16 produces a radial force that is essential to the seal at the seal ring or location 21. As shown in the figure the left (as viewed) axial extremity of the grip 16 abuts the periphery of the end 15. Thus, the cooperation of the threads of the grip 16 with the threads of the wall 20 produces an axial force that is essential to the seal at location 22. Accordingly, two seals are obtained with little difficulty and expense. A standard thread sealant (not shown) may be placed over the threads 23 to improve the quality of the seals.

The above specification has described a new and improved power cord entry device that has two fluid seals. It is realized that the above description may indicate to those skilled in the art additional ways in which the principles of this invention may be used without departing from its spirit. It is, therefore, intended that this invention be limited only by the scope of the appended claims.

Having thus described my invention I claim:

1. Apparatus for providing sealing engagement comprising:
    a wall having a face and a threaded bore extending through the face thereof; said bore having a truncated conical seat therein and internal threads;
    a cord containing a plurality of insulated conductors
    means for producing a first fluid seal;
    means for producing a second fluid seal;
    a molded assembly that is affixed to said cord;
    a cord grip that has substantially a cylindrical section shape and external threads, said cord grip abutting said molded assembly;
    means for urging said molded assembly radially inward to insure said first fluid seal; and means for urging said molded assembly axially to insure said second fluid seal, said first and second seals being disposed in serial relationship.

2. The device claimed in claim 1 wherein: said molded assembly has a seat cooperating with said means for urging said molded assembly axially to insure said second fluid seal.

3. The device claimed in claim 1 wherein: said means for urging said molded assembly radially inward to insure a first fluid seal includes said cord grip.

4. The device claimed in claim 1 wherein: said means for urging said molded assembly radially inward to insure a first fluid seal includes a nut.

5. The device claimed in claim 1 wherein:
    said means for urging said molded assembly axially to insure said second fluid seal includes cooperating threaded elements; and
    one of said threaded elements has a sealant applied thereto.

* * * * *